United States Patent [19]

Yuill et al.

[11] Patent Number: 4,579,589

[45] Date of Patent: Apr. 1, 1986

[54] PROCESS FOR THE RECOVERY OF PRECIOUS METALS FROM A ROASTER CALCINE LEACH RESIDUE

[75] Inventors: William A. Yuill, Tucson, Ariz.; Barbara A. Krebs, Glendale, Calif.; Gretchen L. Graef, Tucson, Ariz.

[73] Assignee: Atlantic Richfield Company, Los Angeles, Calif.

[21] Appl. No.: 676,354

[22] Filed: Nov. 29, 1984

[51] Int. Cl.$^4$ ............................................. C22B 11/00
[52] U.S. Cl. .................................... 75/101 R; 75/108; 75/109; 75/115; 75/118 R; 423/26; 423/27; 423/34; 423/37; 423/41; 423/42; 423/45
[58] Field of Search ................ 423/45, 26, 41, 27, 423/37, 34, 42; 75/108, 109, 118 R, 101 R, 115

[56] References Cited

U.S. PATENT DOCUMENTS

| 3,891,522 | 6/1975 | McKay et al. | 75/108 |
| 3,902,896 | 9/1975 | Borbely et al. | 75/118 R |
| 3,974,253 | 8/1976 | Snell | 423/41 |
| 4,127,639 | 11/1978 | Piret et al. | 75/118 R |
| 4,278,539 | 7/1981 | Santhanam et al. | 423/37 |

FOREIGN PATENT DOCUMENTS 762986 6/1975 South Africa .

Primary Examiner—John Doll
Assistant Examiner—Robert L. Stoll
Attorney, Agent, or Firm—F. Lindsey Scott

[57] ABSTRACT

A process for separating precious metals from a roaster calcine leach residue from a process wherein copper or zinc sulfides are roasted to produce a copper or zinc calcine; the calcine is leached with an aqueous sulfuric acid leaching solution to produce a copper or zinc-containing leaching solution and a roaster calcine leach residue and the copper or zinc-containing leaching solution is separated from the roaster calcine leach residue wherein the process comprises:

(a) intimately contacting the roaster calcine leach residue with an aqueous sulfuric acid leach solution containing from about 5 to about 200 grams per liter of sulfuric acid to produce a slurry of leach solution and roaster calcine leach residue and to dissolve precious metal from roaster calcine leach residue;

(b) adding copper or zinc sulfide solids to the mixture of leach solution and said roaster calcine each residue;

(c) agitating the copper or zinc sulfide solids in intimate contact with the mixture of leach solution and roaster calcine leach residue under oxidizing conditions for a time from about 5 to about 20 minutes to collect precious metal on the copper or zinc sulfide solids;

(d) separating the leach solution from the roaster calcine leach residue and the copper or zinc sulfide solids; and, (e) separating the copper or zinc sulfide solids from the roaster calcine leach residue by a froth flotation process.

20 Claims, 1 Drawing Figure

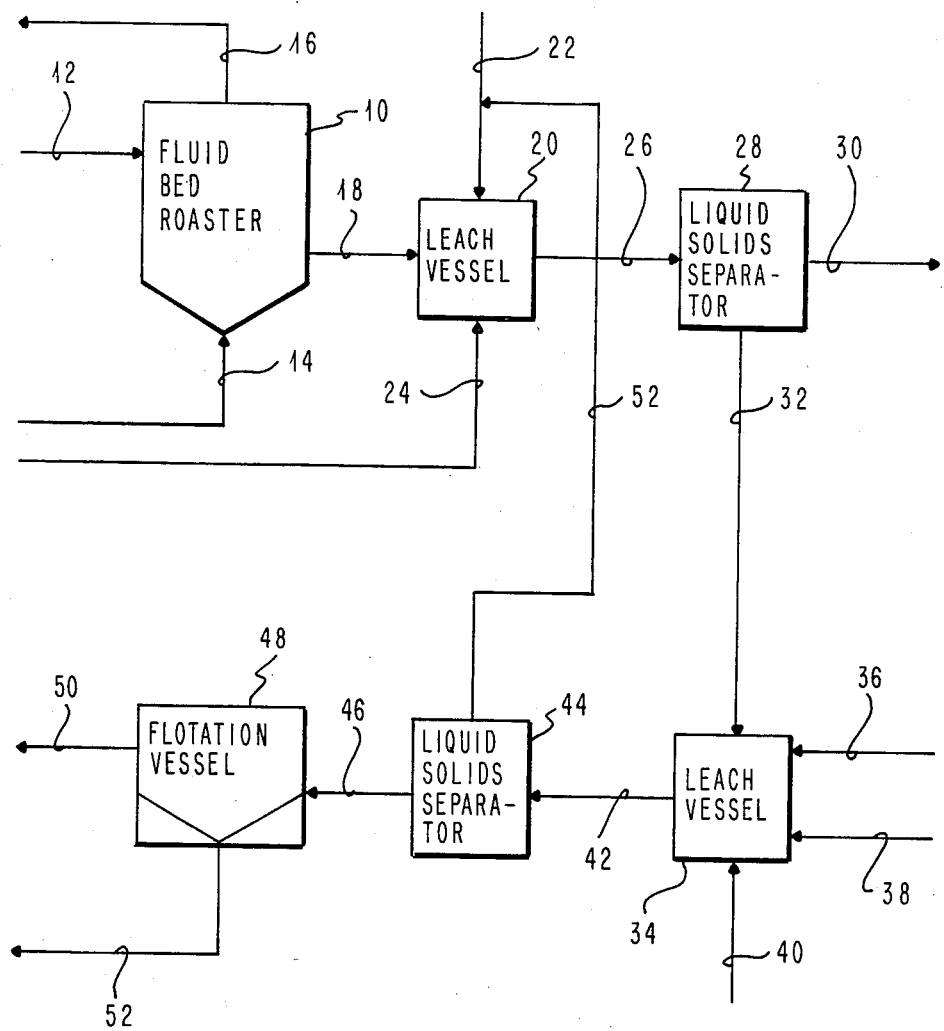

PROCESS FOR THE RECOVERY OF PRECIOUS METALS FROM A ROASTER CALCINE LEACH RESIDUE

This invention relates to the recovery of precious metals from leach residues from roaster calcines from a process wherein metal sulfides such as copper or zinc sulfides are roasted to produce a metal calcine which is thereafter leached with an aqueous sulfuric acid solution to recover metal from the metal calcine leaving a leach residue.

In many processes for the production of copper or zinc metal from copper sulfide or zinc sulfide ores, roasting is used. Similar processes are used for the recovery of these metals from their respective sulfide ores and they will be referred to herein as metals unless one or the other is identified. In the roasting process, the metal sulfide materials are converted to metal oxide or metal sulfate materials which are soluble in sulfuric acid leaching solutions. The metal calcine resulting from such roasting processes is normally leached with an aqueous sulfuric acid solution to produce a metal-containing leach solution which is passed to further processing for metal recovery with the residual solids being passed to disposal or further treatment for the recovery of residual metal values. It has been found in such processes that when precious metals such as silver and gold are present in the metal sulfide ores subjected to roasting, such precious metals are found with the solids after the leaching step. In many instances it is desirable that the precious metal values be recovered, and a variety of processes have been used to recover such precious metal values. Some such processes include treatment of the solid residues with cyanide or brines. Both these processes suffer significant disadvantages. Cyanide leaching involves neutralizing the leach residue with lime to preclude the formation of cyanide gas and, further, the base metals (gangues) remaining in the leach residue may consume considerable quantities of cyanide. Similarly, brine leaching suffers disadvantages in that such systems are extremely corrosive and it is difficult to remove the precious metals from brine solutions. As a result, a continuing effort has been directed to the development of a method whereby such precious metal values can be effectively and economically extracted from roasting calcine leach residues.

In the preparation of the present application, the following references were considered:

U.S. Pat. No. 3,886,257 issued to Snell on May 17, 1975;

U.S. Pat. No. 3,902,896 issued to Borbely et al. on Sept. 2, 1975;

U.S. Pat. No. 3,974,253 issued to Snell on Aug. 10, 1976;

U.S. Pat. No. 4,070,182 issued to Genik-Sas-Berezowsky et al. on Jan. 24, 1978;

U.S. Pat. No. 4,111,688 issued to Ichijo on Sept. 5, 1978;

U.S. Pat. No. 4,138,248 issued to Narain on Feb. 6, 1979;

U.S. Pat. No. 4,145,212 issued to Bodson on Mar. 20, 1979;

U.S. Pat. No. 4,152,143 issued to Kausel et al. on May 1, 1979;

U.S. Pat. No. 4,177,068 issued to Balakrishnan et al. on Dec. 4, 1979;

U.S. Pat. No. 4,225,342 issued to Freeman et al. on Sept. 30, 1980;

U.S. Pat. No. 4,266,972 issued to Redondo-Abad et al. on May 12, 1981;

U.S. Pat. No. 4,269,622 issued to Kerley, Jr. on May 26, 1981;

"Special Report," C&EN, Feb. 8, 1982, p. 54;

"New Oxidative Leaching Process Uses Silver to Enhance Copper Recovery," G. J. Snell and M. C. Sze, Engineering Development Center, C-E Lummus, E/MJ, October, 1977, pp., 100–105, 167;

"Electrochemistry in Silver Catalyzed Ferric Sulfate Leaching of Chalcopyrite," J. D. Miller, P. J. McDonough, and H. Q. Portillo, Department of Metallurgy and Metallurgical Engineering, University of Utah, pp. 327–338;

Ore Deposits, Park et al., 2nd Ed., 1970, pp. 478–484;

"Nature and Properties of Materials," p. 938; "Table 23-2 Standard Oxidation-Reduction Potentials and Equilibrium Constants," Pauling, College Chemistry, 2nd Ed., 1957, p. 484.

These references are hereby incorporated in their entirety by reference.

The article entitled "New Oxidative Leaching Process Uses Silver to Enhance Copper Recovery" and U.S. Pat. No. 3,974,253 both discuss the recovery of silver from residues from a leaching process. The silver recovery system discussed in these two references relates to a system where substantial quantities of silver are present in the residue materials and wherein the silver is recovered primarily in the form of an aqueous solution for recycle as a catalyst. The recovery of residual quantities of silver from the process is disclosed to be by way of conventional precious metal recovery processes such as cyanide polishing, or the like.

According to the present invention, it has been found that silver is effectively and economically separated from a roaster calcine leach residue from a process wherein metal sulfides such as copper or zinc sulfides are roasted to produce a metal calcine; said metal calcine is leached with an aqueous sulfuric acid leaching solution to produce a metal-containing leaching solution and a roaster calcine leach residue and said metal-containing leaching solution is separated from said roaster calcine leach residue, said process comprising:

(a) Intimately contacting said roaster calcine leach residue with an aqueous sulfuric acid leach solution containing from about 5 to about 200 grams per liter of sulfuric acid to produce a mixture of said leach solution and said roaster calcine leach residue and dissolve precious metal from said roaster calcine residue;

(b) Adding metal sulfide solids to said mixture of said leach solution and said roaster calcine leach residue;

(c) Agitating said metal sulfide solids in intimate contact with said mixture of said leach solution and said roaster calcine leach residue under oxidizing conditions for a time from about 5 to about 20 minutes to collect precious metal on said metal sulfide solids;

(d) Separating said leach solution from said roaster calcine leach residue and said metal sulfide solids; and (e) Separating said metal sulfide solids from said roaster calcine leach residue by a froth flotation process.

The FIGURE is a schematic diagram of an embodiment of the present invention.

This invention is useful for the recovery of precious metals from roaster calcine leach residues from roaster calcines from processes wherein copper or zinc sulfides are roasted to produce a copper or zinc calcine which is thereafter leached with aqueous sulfuric acid to recover copper or zinc respectively from the copper or zinc calcine. For convenience, the process will be described in connection with the FIGURE by reference to copper.

In the FIGURE, a stream containing copper sulfides such as chalcopyrite are charged to a fluidized bed roaster 10 via a line 12. Desirably, the copper sulfides charged to fluidized bed 10 are relatively concentrated and, when chalcopyrite is the primary copper sulfide, concentrations as high as 80 wt. percent chalcopyrite or even higher may be presented in the stream of solids charged to fluidized bed roaster 10. Fluidized bed roaster 10 is operated, as known to those skilled in the art, using a suitable free oxygen-containing fluidizing gas, such as air, oxygen enriched air, or the like, which is charged to fluidized bed roaster 10 through a line 14. Exhaust gases, including sulfur oxides and other oxidation products, are recovered from fluidized bed roaster 10 through a line 16 and passed to scrubbing or other treatment as required for discharge to the atmosphere and the like. As well known to those skilled in the art, sulfur values may be recovered from the exhaust gas stream.

A copper calcine containing copper oxide, copper sulfate, sulfide compounds and the like is recovered from fluidized bed roaster 10. The copper calcine may also contain quantities of $Fe_2O_3$ or $Fe_3O_4$. The copper calcine may also contain minor quantities of unoxidized copper sulfide materials. Such fluidized bed roasters may operate at a temperature in the neighborhood of about 1150° F. and generally from about 20 to about 40 percent excess air is used based upon the stoichiometric quantities of air required for the oxidation reactions in fluidized bed roaster 10. The copper calcine recovered through line 18 is passed to a leach vessel 20 where it is contacted, preferably with agitation, with a leaching solution which is suitably aqueous sulfuric acid containing a suitable concentration of sulfuric acid to leach copper from the copper calcine. Desirably, oxygen is bubbled through the solution in leach vessel 20 in an amount sufficient to keep iron in its solid form, i.e., ferric iron such as magnetite or other refractory iron. Typically, the copper calcine is treated in leach vessel 20 as a slurry containing from about 20 to about 30 weight percent solids. After a suitable leaching period, the mixture of leaching solution and solids is passed through a line 26 to a liquid/solids separator 28 where a copper containing leaching solution is recovered through a line 30 and passed to solvent extraction, or other suitable metal recovery, to remove copper and other metals. The acid solution after metal removal is desirably recycled to leaching vessel 20. The solids separated from the leaching solution in liquid/solids separator 28 are passed through a line 32 to a leach vessel 34. It has been found in processes such as discussed above, which are considered to be well known to those skilled in the art, that precious metal values such as silver are found primarily with the solids recovered through line 32. Since in many instances, these precious metal values represent a substantial quantity of precious metal, it is highly desirable that these precious metals be recovered. According to the present invention, it has been found that precious metals are readily recovered by contacting the roaster calcine leach residue in leach vessel 34 with an aqueous sulfuric acid leach solution supplied through a line 36 to produce a mixture of the leach solution and the roaster calcine leach residue in vessel 34 with the mixture being aerated with a free oxygencontaining gas such as air supplied through a line 40. The aqueous sulfuric acid leach solution supplied through line 36 typically contains from about 5 to about 200 grams per liter of sulfuric acid and desirably the mixture is maintained at a pH from about 1 to about 2. The mixture in vessel 34 should be maintained in an oxidizing condition which may be established and maintained by sparging a free oxygen-containing gas such as air, oxygen or oxygen-enriched air into the mixture in vessel 34 or by the presence of a suitable oxidant such as a source of ferric ions or the like in the mixture in vessel 34. Conditions in vessel 34 should be oxidizing with respect to sulfur. After establishment of oxidizing conditions in vessel 34, copper sulfide solids are added through a line 38. Desirably, the copper sulfide solids comprise chalcopyrite although other copper sulfides such as chalcocite, digenite and covellite may be used. it has been found that at these conditions in vessel 34, silver is selectively dissolved from the roaster calcine leach residue and deposited on the copper sulfide solids. While Applicants do not wish to be bound by any particular theory, it appears that the precious metals which are normally dissolved to a slight degree under such conditions are selectively collected on the copper sulfides as more precious metal is dissolved into the solution as a result of the depletion of the precious metal in solution by the selective collection of the precious metal on the copper sulfide solids. Thus, the precious metal is in the process of being dissolved from the leach residue and collected on the copper sulfide solids during the time the copper sulfide solids are in vessel 34. By contrast to treatments such as cyanide leaching, the present process does not require that the precious metals be recovered with the leach solution. Further, such residues may consume large amounts of cyanide, especially if metals such as copper and zinc are present and the use of cyanide in an acid system poses a substantial risk of hydrogen cyanide gas generation. Accordingly, solutions which have a much lower precious metal content at process conditions can be used since the precious metal is selectively removed more or less continuously from the solution onto the copper sulfide solids and dissolved more or less continuously from the leach residue. Both silver and gold are recovered and other precious metals may also be recovered. The present invention is particulary well suited to the recovery of silver, although as indicated gold is also normally recovered with the silver. The quantity of copper sulfide solids added to vessel 34 is suitably an amount effective for the collection of the precious metals onto the solids but limited to produce a concentrate suitable for precious metal recovery. Such amounts are from about 20 to about 50 wt. percent of the leach residue in line 32. While it is desirable that the copper solids be maintained in contact with the mixture in vessel 34 for an effective time, i.e., from about 5 to about 20 minutes, it is undesirable that the copper sulfide solids remain in contact with the mixture in vessel 34 for longer periods of time. Since the selective collection of the precious metals on the copper sulfide solids requires the partial dissolution of the copper sulfide solids, it is undesirable that the copper sulfide solids be left in vessel 34 for unduly long time periods because the copper sulfide solids, especially the smaller particles, may dissolve completely with the resulting release of precious metals into solution to the detriment of the recovery of the precious metals. Typical reaction temperatures in leach vessel 34 are from about 80° to about 90° C. The solids comprising the mixture of leach residue solids and copper sulfide solids are desirably present in vessel 34 as a slurry containing from about 10 to about 60 wt. percent solids and preferably from about 25 to about 50 wt. percent solids. Desirably, leach vessel 34 is agitated as is leach vessel 20. The mixture of leach solution, roaster calcine leach residue and copper sulfide solids is removed from leach vessel 34 via a line 42 and passed to a liquid/solids separator where the leach solution is recovered and optionally passed through a line 52 to form a portion of the aqueous acid solution required in leach vessel 20. Desirably, the sulfuric acid solution used in leach vessel 34 comprises make-up sulfuric acid which is relatively pure by contrast to the sulfuric acid recovered through line 52 which will normally contain minor quantities of copper. Clearly, such quantities of copper will be recovered via line 30 and passed to further processing. The solids separated in separator 44 are passed through a line 46 to a flotation vessel 48. The pH of the solids passed through line 46 is desirably adjusted prior to the flotation process as necessary. The pH can be increased by the addition of lime to the solids and the solids may be further ground. The solids are desirably diluted to a suitable concentration for the conduct of a flotation process. The neutralization or pH adjustment step may take the form of a rinse step followed by a neutralization step or the solids may be simply treated with lime or the like to increase the pH to a desired level. Conventional froth flotation processes may be used in flotation vessel 48 to separate the copper sulfide solids from the remaining residues. The remaining residue is discarded through line 50. The copper sulfide materials recovered from flotation vessel 48 through line 52 contain a major portion, and in some instances in excess of 90%, of the silver and gold contained in the copper sulfides charged to fluidized bed roaster 10 through line 12. These concentrated copper sulfides are passed to further processing for the recovery of copper and precious metal values as known to those skilled in the art. A further benefit accomplished by the process of the present invention lies in the recovery of additional copper sulfide solids through line 52. As noted previously, frequently quantities of the copper sulfide materials charged to fluidized bed roaster 10 are unreacted in the copper calcine. The copper values in such solids are not readily recovered in leach vessel 20. As a result, these copper values remain with the solids recovered through line 32 and are carried through the process to recovery in line 52.

While the invention has been described by reference to copper, it should be understood that the present invention may also be used to recover precious metals from leach residues from zinc roasting and leaching processes of the same type. The roasting and leaching process conditions may vary slightly as known to those skilled in the art. Such variations need not be discussed in detail. In vessel 34 the quantity of zinc sulfide solids, such as sphalerite and the like, is desirably from about 20 to about 50 wt. percent based on the weight of the leach residue in line 32. In general, the process of the present invention is substantially the same for the recovery of precious metals from copper or zinc calcine leach residues except as noted above.

Having thus described the invention by reference to certain of its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A process for separating precious metals from a roaster calcine leach residue from a process wherein metal sulfides selected from the group consisting of copper sulfides and zinc sulfides are roasted to produce a metal calcine; said metal calcine is leached with an aqueous sulfuric acid leaching solution to produce a metalcontaining leaching solution and a roaster calcine leach residue and said metal-containing leaching solution is separated from said roaster calcine leach residue, said process comprising:
   (a) Intimately contacting said roaster calcine leach residue with an aqueous sulfuric acid leach solution containing from about 5 to about 200 grams per liter of sulfuric acid to produce a slurry of said leach solution and said roaster calcine leach residue and to dissolve precious metal from said roaster calcine leach residue;
   (b) Adding metal sulfide solids to said mixture of said leach solution and said roaster calcine leach residue;
   (c) Agitating said metal sulfide solids in intimate contact with said mixture of said leach solution and said roaster calcine leach residue under oxidizing conditions for a time from about 5 to about 20 minutes to collect precious metal on said metal sulfide solids;
   (d) Separating said leach solution from said roaster calcine leach residue and said metal sulfide solids containing said precious metal; and
   (e) Separating said metal sulfide solids containing said precious metal from said roaster calcine leach residue by a froth flotation process.

2. The process of claim 1 wherein said roaster calcine leach residue is contacted with said leach solution at a temperature from about 80° to about 90° C.

3. The process of claim 1 wherein said mixture is maintained at a pH from about 1 to about 2.

4. The process of claim 1 wherein mixture is aerated with a free oxygen containing gas to maintain an oxidizing condition in said mixture.

5. The process of claim 1 wherein said metal sulfide solid is a copper sulfide.

6. The process of claim 5 wherein said copper sulfide solids comprise chalcopyrite.

7. The process of claim 6 wherein said copper sulfide solids are added to said mixture in an amount equal to from about 20 to about 60 wt. percent based on the weight of said roaster calcine leach residue solids.

8. The process of claim 1 wherein said metal sulfide solid is a zinc sulfide.

9. The process of claim 8 wherein said zinc sulfide comprises sphalerite.

10. The process of claim 8 wherein said zinc sulfide is added to said mixture in an amount from about 20 to about 50 wt. percent based on the weight of said roaster calcine leach residue solids.

11. A process for separating precious metals from a roaster calcine leach residue from a process wherein copper sulfides are roasted to produce a copper calcine; said copper calcine is leached with an aqueous sulfuric acid leaching solution to produce a copper-containing leaching solution and a roaster calcine leach residue and said copper-containing leaching solution is separated from said roaster calcine leach residue, said process comprising:

(a) Intimately contacting said roaster calcine leach residue with an aqueous sulfuric acid leach solution containing from about 5 to about 200 grams per liter of sulfuric acid to produce a slurry of said leach solution and said roaster calcine leach residue and to dissolve precious metal from said roaster calcine leach residue;

(b) Adding copper sulfide solids to said mixtrue of said leach solution and said roaster calcine leach residue;

(c) Agitating said copper sulfide solids in intimate contact with said mixture of said leach solution and said roaster calcine leach residue for a time from about 5 to about 20 minutes to collect precious metal on said copper sulfide solids;

(d) Separating said leach solution from said roaster calcine leach residue and said copper sulfide solids containing said precious metal; and (e) Separating said copper sulfide solids containing said precious metal from said roaster calcine leach residue by a froth flotation process.

12. The process of claim 11 wherein said roaster calcine leach residue is contacted with said leach solution at a temperature from about 80° to about 90° C.

13. The process of claim 11 wherein said mixture is maintained at a pH from about 1 to about 2.

14. The process of claim 11 wherein said copper sulfide solids comprise chalcopyrite.

15. The process of claim 11 wherein said copper sulfide solids are added to said mixture in an amount equal to from about 20 to about 50 wt. percent based on the weight of said roaster calcine leach residue solids.

16. A process for separating precious metals from a roaster calcine leach residue from a process wherein zinc sulfides are roasted to produce a zinc calcine; said zinc calcine is leached with an aqueous sulfuric acid leaching solution to produce a zinc-containing leaching solution and a roaster calcine leach residue and said zinc-containing leaching solution is separated from said roaster calcine leach residue, said process comprsing:

(a) Intimately contacting said roaster calcine leach residue with an aqueous sulfuric acid leach solution containing from about 5 to about 200 grams per liter of sulfuric acid to produce a slurry of said leach solution and said roaster calcine leach residue and to dissolve precious metal from said roaster calcine leach residue;

(b) Adding zinc sulfide solids to said mixture of said leach solution and said roaster calcine leach residue;

(c) Agitating said zinc sulfide solids in intimate contact with said mixture of said leach solution and said roaster calcine leach residue for a time from about 5 to about 20 minutes to collect precious metal on said zinc sulfide solids;

(d) Separating said leach solution from said roaster calcine leach residue and said zinc sulfide solids containing said precious metal; and (e) Separating said metal sulfide solids from containing said precious metal said roaster calcine leach residue by a froth flotation process.

17. The process of claim 16 wherein said roaster calcine leach residue is contacted with said leach solution at a temperature from about 80° to about 90° C.

18. The process of claim 16 wherein said mixture is maintained at a pH from about 1 to about 2.

19. The process of claim 16 wherein said zinc sulfide solids comprise sphalerite.

20. The process of claim 16 wherein said zinc sulfide solids are added to said mixture in an amount equal to from about 40 to about 60 wt. percent based on the weight of said roaster calcine leach residue solids.

* * * * *